(12) United States Patent
Taillefer (10) Patent No.: US 7,434,025 B2
(45) Date of Patent: Oct. 7, 2008

(54) LEVERAGE GUEST LOGICAL TO PHYSICAL TRANSLATION FOR HOST-SIDE MEMORY ACCESS

(75) Inventor: Martin Taillefer, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 197 days.

(21) Appl. No.: 11/489,079

(22) Filed: Jul. 18, 2006

(65) Prior Publication Data

US 2008/0022068 A1    Jan. 24, 2008

(51) Int. Cl.
*G06F 12/00* (2006.01)
(52) U.S. Cl. ...................................................... 711/203
(58) Field of Classification Search ........................ None
See application file for complete search history.

(56) References Cited

U.S. PATENT DOCUMENTS

| | | | | |
|---|---|---|---|---|
| 5,230,069 A | * | 7/1993 | Brelsford et al. ............ | 718/100 |
| 5,426,748 A | * | 6/1995 | Brenza et al. ............... | 711/203 |
| 6,314,501 B1 | * | 11/2001 | Gulick et al. ............... | 711/153 |
| 2006/0146057 A1 | * | 7/2006 | Blythe ........................ | 345/506 |
| 2007/0162683 A1 | * | 7/2007 | Hattori et al. .................. | 711/6 |
| 2007/0220231 A1 | * | 9/2007 | Sakthivelu et al. .......... | 711/203 |
| 2007/0260827 A1 | * | 11/2007 | Zimmer et al. .............. | 711/154 |

* cited by examiner

*Primary Examiner*—Hiep T Nguyen
(74) *Attorney, Agent, or Firm*—Woodcock Washburn LLP (57) ABSTRACT

Guest logical to physical translation is leveraged for host-side memory access. A contiguous portion of host physical address space is dedicated to the guest operating system. A reusable offset value may be calculated upon guest operating system initialization. Everything stored in the guest "physical" address space can be directly mapped to the contiguous portion of host physical address space using the reusable offset value, if necessary, thereby greatly reducing mapping complexity for both store and look-up operations.

18 Claims, 6 Drawing Sheets

LEVERAGE GUEST LOGICAL TO PHYSICAL TRANSLATION FOR HOST-SIDE MEMORY ACCESS

BACKGROUND

Virtual machine technology generally allows a guest operating system to run on host computer. The host computer may comprise, for example, host hardware, a host operating system and/or hypervisor software that may manage guests, and emulator software that emulates a hardware environment for the guest. As an example, the Virtual PC software created by the former CONNECTIX® Corporation of San Mateo, Calif., emulates an entire computer hardware architecture for a guest operating system, including an INTEL® 80X86 Pentium processor and various motherboard components and cards.

Figure 1:
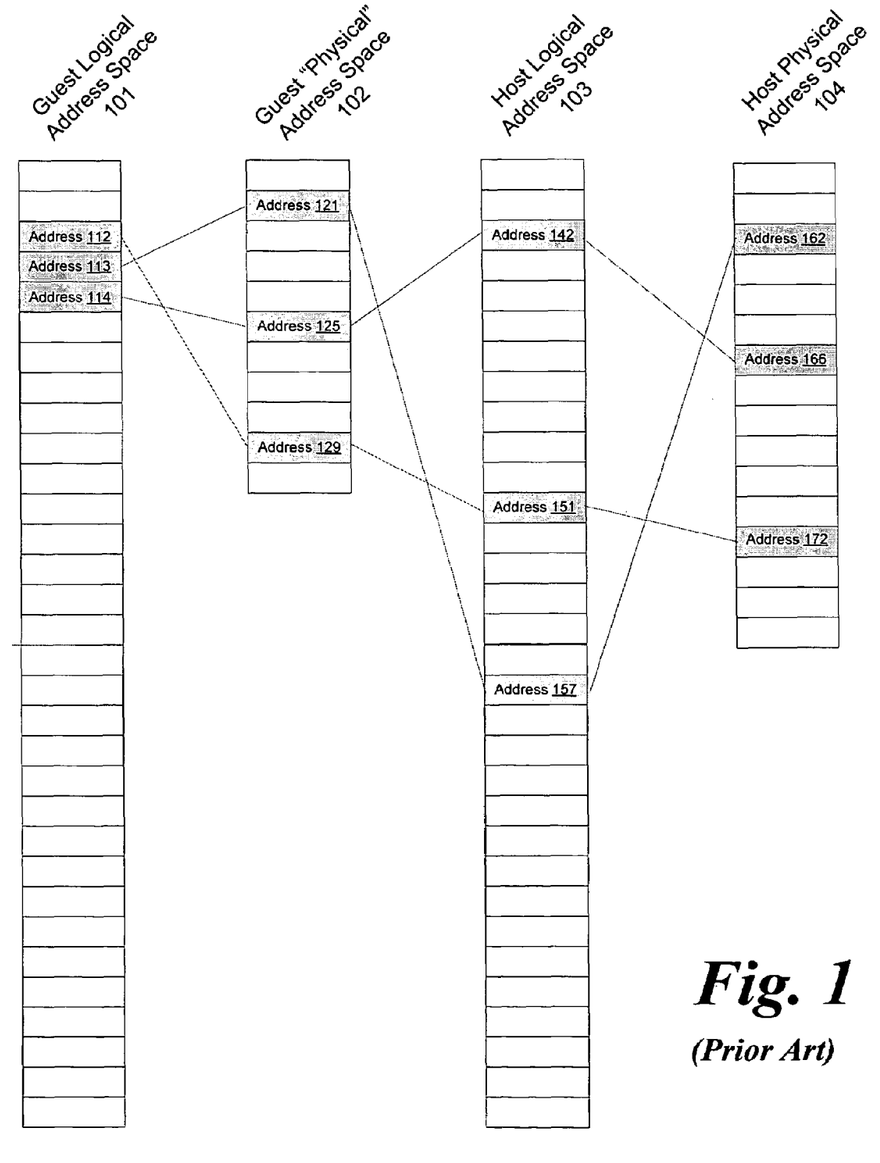
FIG. 1 illustrates prior art address translations in a virtualization environment, in which numerous address mappings must be calculated and tracked.

Within a traditional virtualization environment, memory access by the guest operating system is slowed by multiple levels of address translation, as can be appreciated with reference to FIG. 1. An application running in the guest operating system will utilize a guest logical address space 101. Addresses 112, 113, 114 in the guest logical address space 101 are mapped to a guest "physical" address space 102, e.g., to addresses 121, 125 and 129. The guest "physical" address space 102 appears to be a physical address space to the guest, but in fact it is an emulated address space supported by emulation software running on a host computer. As far as the guest is concerned, it must only keep track of how addresses in the guest logical address space 101 correspond to addresses in the in the guest "physical" address space 102 by means of look-up tables and the like, as would an ordinary operating system. This presents a first layer of translation that occurs.

Using traditional virtualization approaches, emulation software will also use a logical address space 103 and a physical address space 104. A translation table will be kept to translate guest physical addresses 121, 125, 129 into host logical addresses 142, 151, 157, and yet another translation will be carried out to map host logical addresses 142, 151, 157 to host physical addresses 162, 166, 172. This presents two additional layers of translation. Only after these translations occur can the appropriate data be retrieved from host memory.

In other words, in order to support guest operating system access to host hardware, at least three layers of translation are performed in traditional systems. First, the guest translates logical addresses to physical addresses, next the host translates guest physical addresses to host logical addresses, and finally the host translates host logical addresses to host physical addresses. Only after these translations occur can host hardware operate on the resulting host physical addresses, which affect the original buffer of memory stored within the original guest logical address space.

As can be appreciated from FIG. 1, the traditional model presents numerous levels of indireaction in memory access operations. Each level of indireaction costs valuable processor clock cycles and slows the performance of the guest operating system. In view of this and other difficulties in supporting a guest operating system, solutions are needed which will increase the efficiency of memory access by a guest operating system.

SUMMARY

In consideration of the above-identified shortcomings of the art, the present invention provides systems and methods for leveraging guest logical to physical translation for host-side memory access. A contiguous portion of host physical address space can be dedicated to the emulation software and/or guest operating system. A reusable offset value may then be calculated, for example upon guest operating system initialization. Everything stored in the guest "physical" address space can be directly mapped to the contiguous portion of host physical address space using the reusable offset value, thereby greatly reducing mapping complexity for both store and look-up operations. Similarly, a contiguous portion of host logical address space can be utilized by emulation software. A second reusable offset value may similarly be calculated such that everything stored in the host logical address space can be directly mapped to the contiguous portion of host physical address space using the second reusable offset value. Once again, mapping complexity is greatly reduced. The host thus leverages the translation conducted by the guest operating system, and performs only minimal modification of the resulting addresses before communicating with host hardware. Other advantages and features of the invention are described below.

BRIEF DESCRIPTION OF THE DRAWINGS

The systems and methods for leveraging guest logical to physical translation for host-side memory access in accordance with the present invention are further described with reference to the accompanying drawings in which:

FIG. 4 illustrates a device with device hardware 410 and host software 420. Guest operating system 430 performs translation from guest logical addresses to guest physical addresses. The host 420 allocates contiguous portions of host address space for use by the emulator 421, then calculates reusable offset values to map guest physical addresses to host address spaces.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Figure 2:
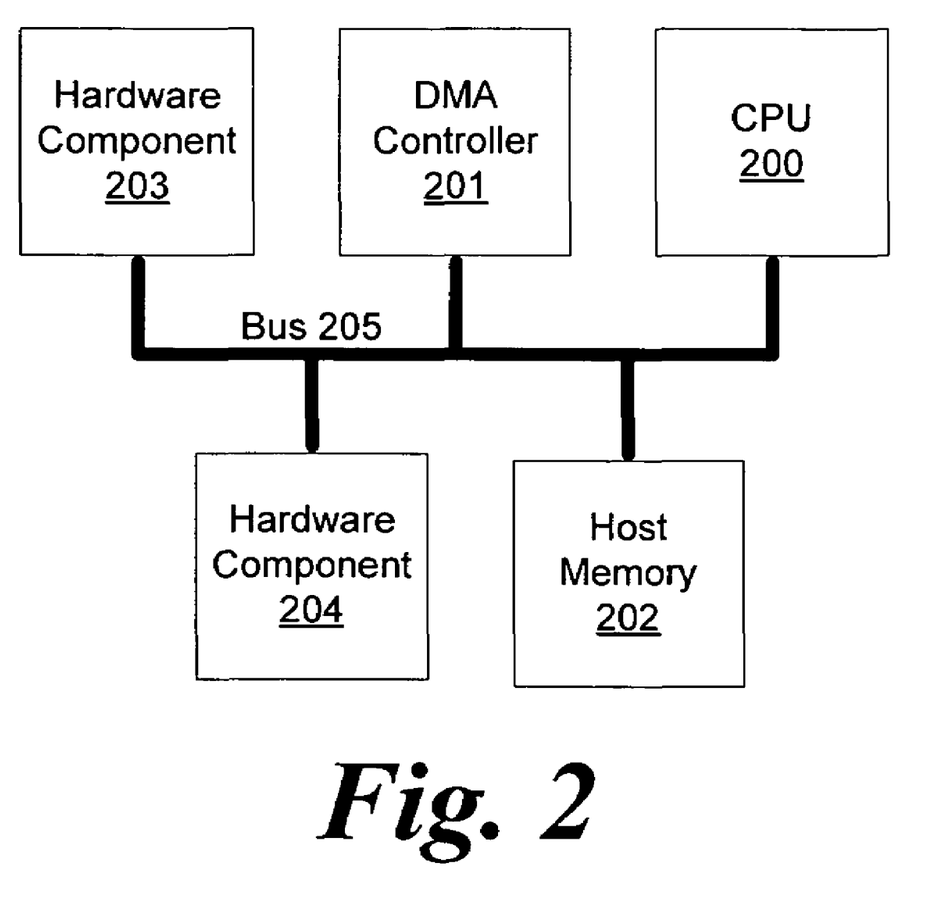
FIG. 2 illustrates a general device architecture in which host hardware comprising a memory is accessed by the various device components.

FIG. 2 illustrates a general hardware operating environment and context for embodiments of the invention. FIG. 2 and many aspects of computer hardware and virtualization technology are generally appreciated by those of skill in the art. FIG. 2 should thus be considered one exemplary hardware environment in which a variety of software may execute, and any combination of hardware and software may combine to implement the invention. Alternate or subsequently developed device architectures and software operating systems may also be appropriate contexts for embodiments of the invention.

Referring to FIG. 2, a Central Processing Unit (CPU) 200 executes software instructions and communicates with other hardware components via bus 205. Software instructions are generally governed by a host operating system, hypervisor, or the like. Such software is referred to herein as the "host." The host may provide a variety of useful functions for a user of the device, but more importantly the host is the gateway through which other software such as an application, e.g., an emulator application that emulates a hardware environment for a guest operating system can access physical device hardware. Because the host has primary control over the hardware illustrated in FIG. 2, such hardware may also be referred to as host hardware. One aspect of host hardware is host memory 202. A host may write or store data to memory 202 and/or read or "look-up" data in memory 202. Other aspects of host hardware may be any number of components 203, 204 such as cards, drives, and so forth.

One way for a host or hardware components 203, 204 to accomplish memory access is via instructions to the CPU 200. However, because memory 202 access can be costly in terms of CPU 202 clock cycles, modern devices often implement some variety of Direct Memory Access (DMA) technology. In such embodiments, a component such as exemplary DMA controller 201 can perform memory access operations on behalf of the CPU 200. Hardware components 203, 204 may perform memory access operations directly via DMA controller 201, or the CPU 200 may outsource memory access work to the DMA controller 201.

The location of data in memory 202 is tracked using addresses in an address space. Because an address space may be implemented via a number of technologies and using a wide variety of techniques, the invention is not limited to implementations involving any particular location or implementation of an address space. For example, an address space may be kept by the CPU 200 or by DMA controller 201, but need not necessarily reside in those locations.

In a typical scenario, applications running on a host are provided with a logical address space that is mapped to a physical address space. This allows applications to be presented with an address space that may be larger or smaller than what the physical address space would otherwise allow. Such arrangements are well known to those of skill in the art, and so the concepts of a "logical address space" and a "physical address space" are used herein with their usual meaning. The logical address space is implemented by a number of supporting technologies and a variety of implementations are possible, but for the purpose of this description the logical address space may be thought of as an address space in much the same manner as the physical address space is an address space.

Figure 3:
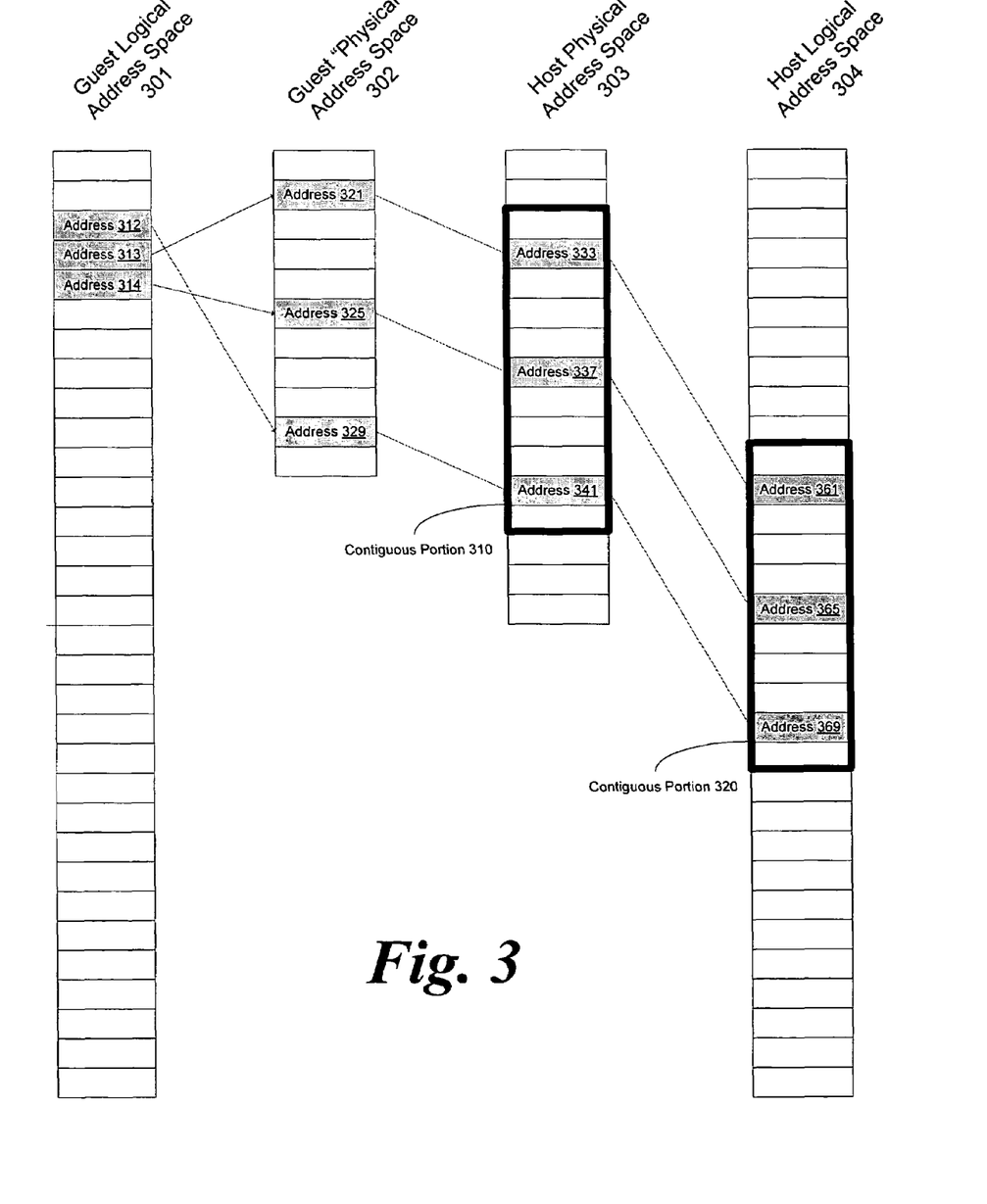
FIG. 3 illustrates address translations in an embodiment of the invention, in which a contiguous portion of host physical address space is used to implement physical memory for a guest operating system, allowing reusable offset values to be accurate means of storing and looking up addresses.

FIG. 3 illustrates address translations in an embodiment of the invention. The increased efficiency of address translation provided by the invention can be appreciated by comparing FIG. 3 with FIG. 1. Instead of following the traditional practice of freely mapping guest physical addresses to the logical and physical address spaces in a host, a contiguous portion of host physical address space 310 can be dedicated for exclusive use by the emulation software, which may in turn dedicate such contiguous portion for guest operating system operations. Dedicating a contiguous portion 310 allows a reusable offset value to be calculated, if necessary, to translate guest physical addresses 321, 325, 329 into host physical addresses 323, 327, 341. The reusable offset value may be calculated upon initialization of the emulator application and/or guest operating system, and can be used for address translations for the lifetime of the instance of the emulator application and guest.

Host side logical addresses 361, 365, 369 may also be translated via a linear translation to host physical addresses 333, 337, 341, and vice versa. Thus, both the guest and the host inherently operate using their respective logical addresses, which eventually get mapped to a contiguous portion of host physical address space 310, which may in turn be used as-is by the host hardware. By dedicating a contiguous portion of host physical address space 310, both the mapping of guest physical addresses to host physical addresses and the mapping of host logical addresses to host physical addresses become greatly simplified.

It should be noted at this juncture that the need to calculate reusable offset values can be avoided in some embodiments of the invention. In such embodiments, the host software can be configured to automatically reserve a predetermined contiguous portion of host physical address space for a guest operating system. The reserved portion can be selected to directly map to the values of the guest physical address space. For example, if a guest address space consists of addresses 1 to 10, then a reserved contiguous portion of host physical address space can also comprise addresses 1 to 10, as opposed to, for example, 10-20 which would require an offset translation. Thus, the offset would be guaranteed to be zero and there would be no need to calculate an offset value or to perform any translation between guest physical address space and host physical address space. Additional ease of implementation can be accomplished by modifying hardware to eliminate any need for explicit "clamping" or dedication of address space to the exclusive use of the guest operating system. A pre-dedicated area of physical address space could instead be provided.

While offset calculation and use can be avoided, offsets present only a minimal amount of conversion between the guest physical and host physical domains by applying a fixed delta and clamping the addresses. This conversion work is relatively trivial in terms of CPU clock cycles and not a substantial overhead, and has the advantage of ease of implementation in existing hardware and software systems.

Thus with respect to FIG. 3, when a guest within a virtualization environment needs to perform a hardware-level data transfer to a memory buffer, the guest performs a virtual-to-physical translation of one or more guest logical addresses 312, 313, 314 from guest logical address space 301 to guest physical address space 302. The translated guest physical addresses 321, 325, 329 can be placed in a contiguous portion of host physical address space 303 that is dedicated for use by the guest operating system. For example, addresses 121, 125, 129 can be mapped linearly to addresses 333, 337, 341 within contiguous portion 310. Here, an offset of twelve (12) would for example have been added to each of the address values 121, 125, 129. This eliminates the need to do complex translation on the host side.

Allocating a single contiguous portion of host physical memory makes it possible for the host to use a contiguous portion 320 of logical address space 304 to reference the contiguous portion 310 of host physical memory 303. Again, a simple offset value can be used to translate between addresses in contiguous portion 320 and contiguous portion 310. For example, an offset value of eighteen (18) would translate addresses 133, 137, and 141 in host physical address space 303 into addresses 161, 165, and 169 in host logical address space 304.

The reusable offset values make it a trivial operation, in terms of required processing power, to convert from a guest physical address in 302 to host physical address in 303 by simply combining the offset with the known address value. Upon retrieving data from memory, the fact that guest physical addresses 121, 125, 129 are linearly mapped to host physical addresses 133, 137, 141 makes it possible for host hardware to perform DMA directly into guest physical address space 302 without the need to perform additional potentially costly translations.

In one implementation, for example, a guest operating system may implement the Universal Serial Bus (USB) standard interface. In such a situation, the guest can communicate with the USB port on the host hardware more efficiently using the above described approach. Guest physical addresses are adjusted with an offset value, clamped to be within allowed range, and then given directly to the host hardware. Other aspects of a guest operating system may dramatically benefit from this memory model, such as graphics, Ethernet, and hard disk access.

Figure 4:
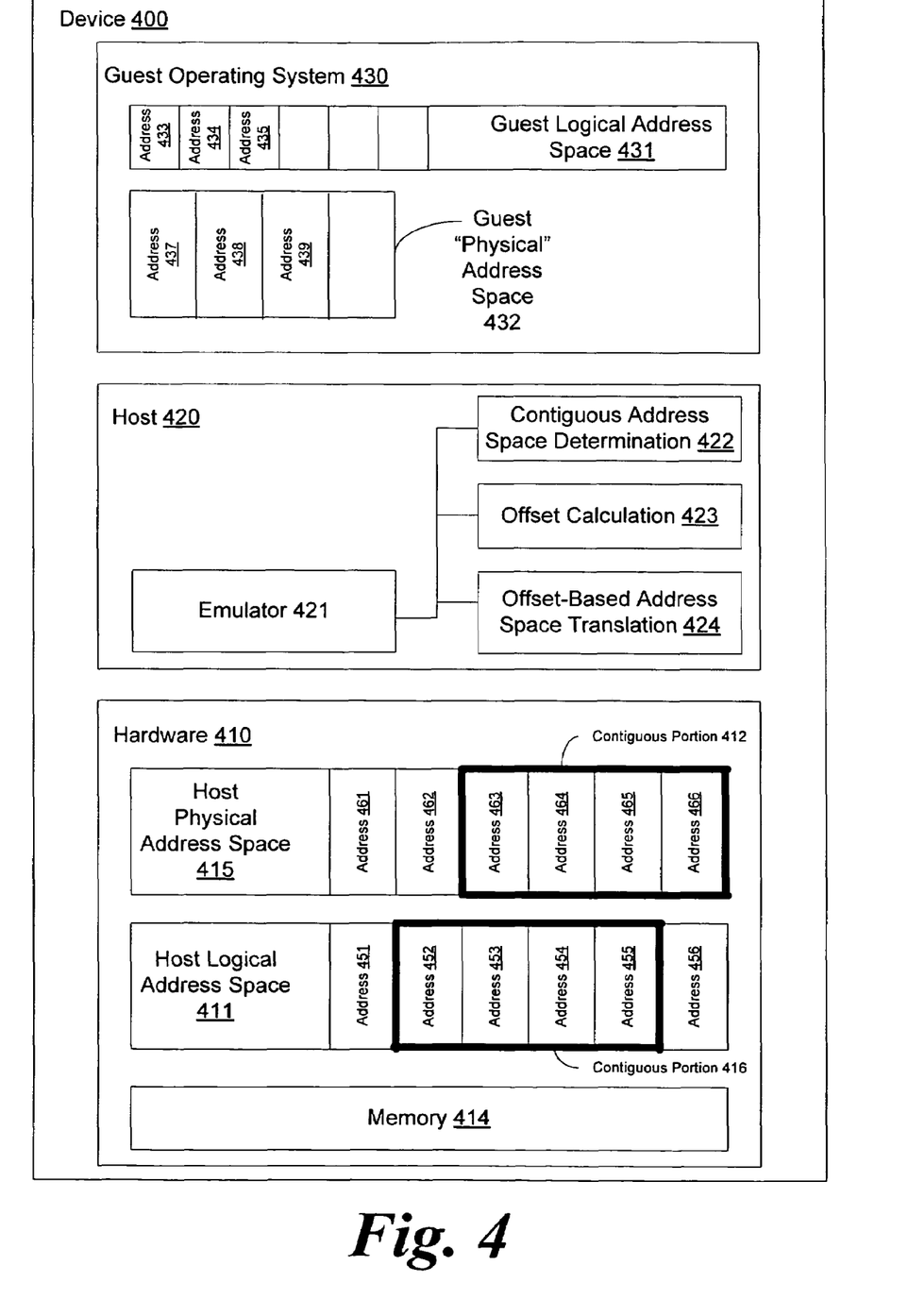

FIG. 4 illustrates a device 400 with device hardware 410 and host software 420. An emulator 421 can run on the host 420 to emulate a hardware environment for one or more guest operating systems such as 430. The emulator is thus an application that runs on host 420, and the guest operating system 430 is in turn supported by the emulator 421. Thus, host hardware 410 resources may be described herein as utilized in some fashion by the emulator 421 or by the guest operating system 430, and it will be understood that some combination of the two may be involved in such situations. Similarly, because the emulator 421 is a software application running on the host 420, actions of the host 420 may be carried out under the umbrella of the emulator application 421 or via other host 420 software, such as via a host 420 operating system or other host software.

Guest operating system 430 performs translation from guest logical addresses 433, 434, 435 to guest physical addresses 437, 438, 439. The host 420 allocates contiguous portions of host address space for use by the guest 430, then calculates reusable offset values to map guest physical addresses to host address spaces. FIG. 4 thus presents a system comprising a guest operating system 430, a host 420, host physical address space 415 and host logical address space 411, in which a method corresponding to one embodiment of the invention may be performed.

First, the host 420 may determine a contiguous portion 412 of host physical address space 415 for use by said guest operating system 430. This may be done by instructions for contiguous address space determination 422 residing in the host 420 either natively or as part of emulator 421. The terms "determine," "allocate," and "dedicate" are used herein with distinct meanings. Determining refers to discovering a portion of an address space 415 that is available or could be made available for the purposes of carrying out the invention. Determining may entail, for example, requesting a host 420 to indicate a section of available address space, or scanning an address space 415 for a best available contiguous portion. Determining does not require the step of actually reserving or clamping the determined portion of memory. In contrast, dedicating requires reserving or clamping a portion of memory for exclusive use by the guest operating system 430 or emulation software 421. Dedicating may also be done by request to a host 420, or directly via interaction with a CPU or DMA subsystem. Finally, allocating is an operation that is conceptually between determining and dedicating. Allocating refers to earmarking a portion of address space for use, but not necessarily exclusive use. Thus, a portion of address space that is allocated may be used for other purposes as well, but it is understood that the allocated section will be used for the allocated purpose.

Next, the host 420 may determine a contiguous portion 416 of host logical address space 411 for use by the emulator 421. Component 422 may again carry out the determination operation. In other host configurations, this may be an automatic result of determining a contiguous portion of physical address space 415. Here, determining can be done by performing calculations that will set the values of addresses in a logical address space 411 that is exposed to emulation software 421. As stated above, logical address space can be implemented via a wide variety of techniques, and the invention is not limited to any particular configuration.

In one embodiment, a first reusable offset value can be calculated, comprising a difference between an address within a guest physical address space 432 and an address of a same memory location within said contiguous portion of host physical address space 412. An offset calculation component 423 residing in the host 420 either natively or as part of emulator 421 may be responsible for offset calculation. For example, a difference between address 437 and address 462 is 26. The value 26 could be used as a reusable offset value for translating all guest physical addresses to host physical addresses. Here, note that the reusable offset value is obtained by comparing addresses in the same relative position within the guest physical address space 432 and the host physical address space 415. The first address in 432 is compared to the first address in 415. Alternatively, the second address in 432 could be compared to the second address in 415, or the third address to the third address, and so forth.

If necessary, a second reusable offset value can be calculated, comprising a difference between an address within said host physical address space 415 and an address within said host logical address space 411 that is within said contiguous portion 416 of host logical address space. Again, offset calculation component 423 may be responsible for computing the offset. Here, the offset value may be calculated in much the same way as previously.

Once any offset values are calculated, subsequent address translation operations may be performed using the first and second reusable offset values. The first reusable offset value may be used when storing guest 430 data in host memory 414. The second reusable offset value may be used when translating host logical addresses 452, 453, 454, 455 to host physical addresses 463, 464, 465, 466. Translations may be performed by offset-based address space translation component 424 residing in the host 420 either natively or as part of emulator 421. In one embodiment, offset-based translation may be performed by supplying the calculated offset values to any native host 420 translation systems. In other embodiments, native translations may be customized or bypassed in favor of custom translations that utilize the simplified offset-based calculation.

The invention may be used in systems involving multiple guest operating systems by dedicating contiguous portions of host memory to any or all of the guest operating systems.

Such embodiments are possible provided that the host has sufficient physical address space resources. To avoid excess physical address space resources, in one embodiment, device 400 may be a "dedicated" system, meaning that it is configured to limit use of a contiguous portion of host physical address space 415 to a single guest operating system. This way, other guests will not overload the device 400 by locking down additional contiguous portions of address space. A dedicated system may run other software besides emulator 421 that supports guest 430, but embodiments that are "dedicated" systems will not run additional emulators that support additional guests according to the techniques of the invention. Thus, in a dedicated host configuration, guest operating system 430 is the only guest operating system that has a contiguous portion of host address space 415 dedicated to it.

The invention is particularly useful in certain types of consumer electronics, such as gaming consoles and mobile devices such as mobile phones, Personal Digital Assistants (PDAs), digital cameras, video player consoles, automobile computer systems and the like. In such devices, a guest operating system that is not configured to run on the particular device can be launched and run at a more acceptable performance level. An emulator and guest operating system can be run as any other application on the device. For example, on a gaming console, the host 420 may be configured to launch emulator software and guest operating system as a game, i.e., allowing a user to insert an optical disk into the console, then automatically launching the emulator and guest operating system through which the user accesses guest operating system functionality. Such an approach provides widespread access to operating systems without requiring devices to natively support the operating system, or, conversely, without requiring operating system software to support the wide variety of devices.

Figure 5:
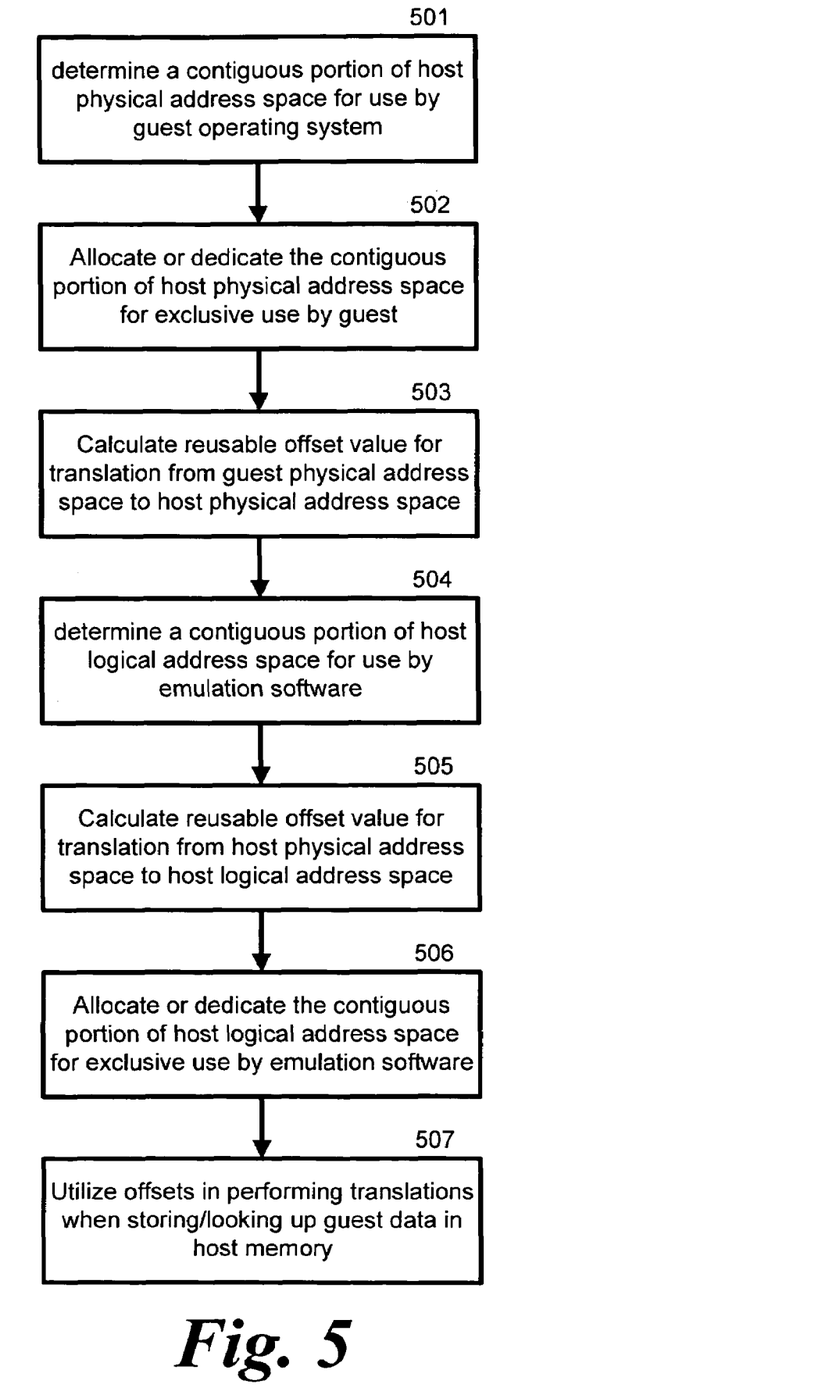
FIG. 5 illustrates a method for determining a contiguous portion of host address space, calculating offset values, and performing address space translations for host side memory access.

FIG. 5 illustrates a method for determining a contiguous portion of host address space, calculating offset values, and performing address space translations for host side memory access. The method of FIG. 5 may be performed in a device such as that of FIG. 4. In general the method comprises enhancing performance of a guest operating system by determining a contiguous portion of host physical address space for use by guest operating system 501, allocating or dedicating the contiguous portion of host physical address space for exclusive use by the guest 502, calculating a reusable offset value for translation from guest physical address space to host physical address space 503, determining a contiguous portion of host logical address space for use by emulation software 504, calculating a reusable offset value for translation from host physical address space to host logical address space 505, allocating or dedicating the contiguous portion of host logical address space for exclusive use by the emulation software 506, and finally utilizing the calculated offsets in performing translations when storing/looking up guest data in host memory 507. It should be emphasized that the steps of FIG. 5 may be omitted in some embodiments, for example calculating offset values may not be necessary in some embodiments as discussed above.

Figure 6:
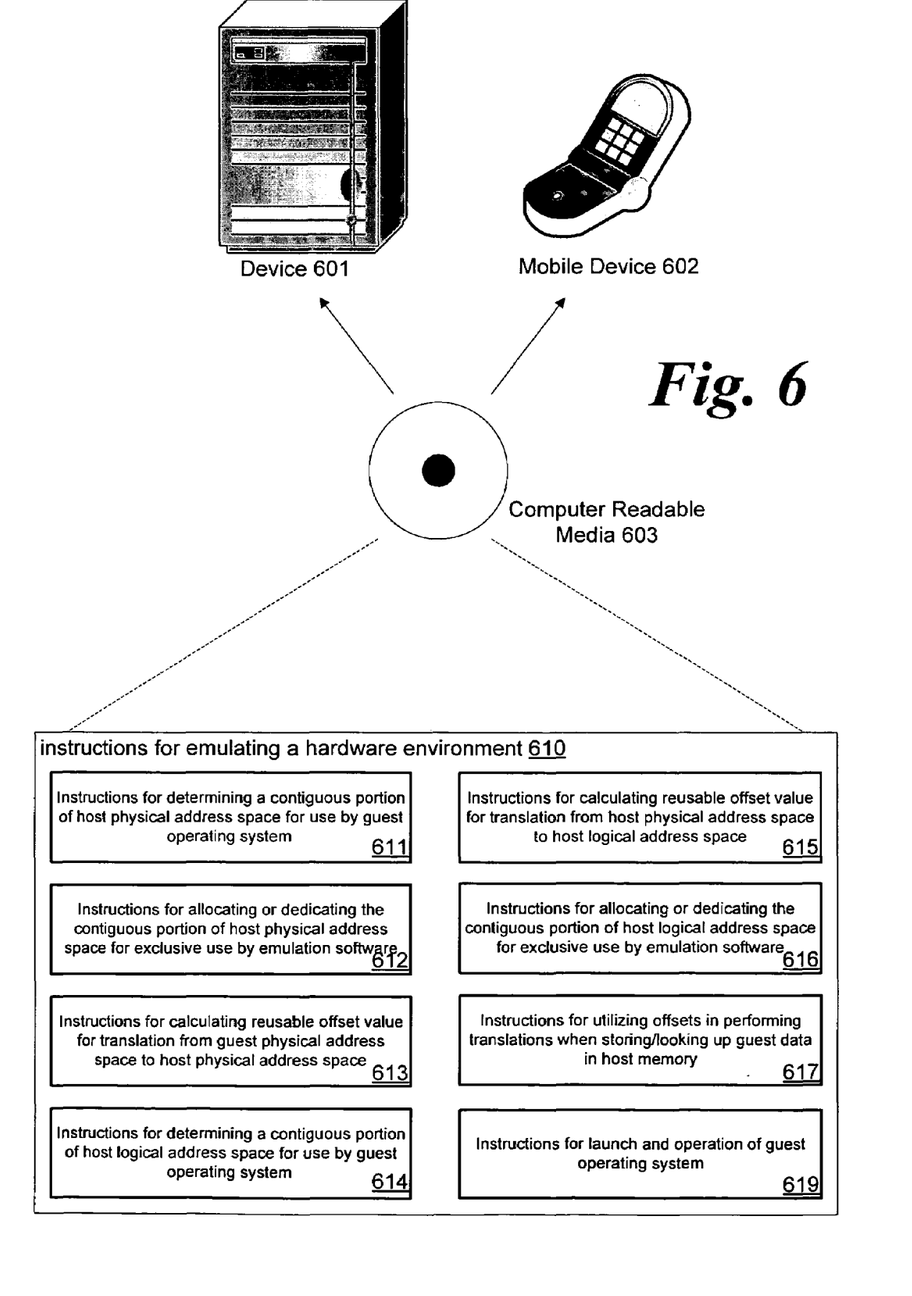
FIG. 6 illustrates an exemplary computer readable medium 603 that can be insertable or fixed within a device 601 or mobile device 602, the computer readable medium bearing computer readable instruction for carrying out aspects of the invention.

FIG. 6 illustrates an exemplary computer readable medium 603 that can be inserted or fixed within a device 601 or mobile device 602, the computer readable medium 603 bearing computer readable instructions for carrying out aspects of the invention. In one configuration, computer readable medium 603 may be an optically readable disk that is inserted into a disk drive in a device such as 601, which may be a gaming console. The device 601 may be configured with instructions to automatically launch the emulator instructions 610 as it would a game. Computer readable media are constantly changing and improving, however, and the invention is not limited to any particular media.

In one embodiment, the computer readable medium 603 may contain some or all of the instruction modules illustrated as instructions for emulating a hardware environment 610. As illustrated, such instructions may comprise instructions for determining a contiguous portion of host physical address space for use by guest operating system 611, instructions for allocating or dedicating the contiguous portion of host physical address space for exclusive use by guest 612, instructions for calculating reusable offset value for translation from guest physical address space to host physical address space 613, instructions for determining a contiguous portion of host logical address space for use by emulation software 614, instructions for calculating reusable offset value for translation from host physical address space to host logical address space 615, instructions for allocating or dedicating the contiguous portion of host logical address space for exclusive use by emulation software 616, instructions for utilizing offsets in performing translations when storing/looking up guest data in host memory 617, as well as instructions for launch and operation of guest operating system 619.

In addition to the specific implementations explicitly set forth herein, other aspects and implementations will be apparent to those skilled in the art from consideration of the specification disclosed herein. It is intended that the specification and illustrated implementations be considered as examples only, with a true scope and spirit of the following claims.

The invention claimed is:

1. In a system comprising a guest operating system, a host, host virtual address space and host physical address space, performing a method comprising:
    determining by said host a contiguous portion of host physical address space for use by said guest operating system;
    calculating a first reusable offset value, said first reusable offset value comprising a difference between an address within a guest physical address space and an address of a same memory location within said contiguous portion of host physical address space;
    calculating a second reusable offset value, said second reusable offset value comprising a difference between an address within said host physical address space and an address within said host logical address space;
    subsequently performing address translation operations using said reusable first and second offset values when storing guest operating system data in host memory.

2. The method of claim 1, wherein said guest operating system is the only guest operating system running on said system.

3. The method of claim 1, further comprising dedicating said contiguous portion of host physical address space to exclusive use by said guest operating system.

4. The method of claim 1, wherein said system is a gaming console.

5. The method of claim 1, wherein said system is a mobile device.

6. A computer readable medium bearing computer readable instructions for emulating a hardware environment for a guest operating system, said instructions comprising:
    instructions for requesting a contiguous portion of host physical address space for use by said guest operating system;
    instructions for calculating a guest physical address space to host physical address space reusable first offset value;
    instructions for calculating a host physical address space to host logical address space reusable second offset value;

instructions for performing address translation operations using said reusable first and second offset values when storing guest operating system data in host memory.

7. The computer readable medium of claim 6, further comprising instructions for dedicating said contiguous portion of host physical address space to exclusive use by said guest operating system.

8. The computer readable medium of claim 6, wherein said computer readable medium resides within a gaming console.

9. The computer readable medium of claim 8, wherein said gaming console is equipped with instructions to launch said instructions for emulating a hardware environment as a game.

10. The computer readable medium of claim 6, wherein said computer readable instructions for emulating a hardware environment for a guest operating system are stored on an optically readable disk configured to be inserted into a disk drive.

11. The computer readable medium of claim 10, wherein said optically readable disk further comprises guest operating system instructions.

12. The computer readable medium of claim 6, wherein said computer readable medium resides within a mobile device.

13. A method for enhancing performance of a guest operating system, comprising:
   allocating a contiguous portion of host address space for use by said guest operating system;
   calculating a first reusable offset value comprising a guest physical address space to host physical address space reusable offset value and a second reusable offset value comprising a host physical address space to host logical address space reusable offset value, wherein each address in said guest address space can be combined with said first reusable offset value and said second reusable offset value to yield a host address within said contiguous portion of host address space;
   performing an address translation from an address in said guest address space to an address in said host address space using said first reusable offset value.

14. The method of claim 13, wherein said allocating a contiguous portion of host address space comprises allocating a contiguous portion of host logical address space and allocating a contiguous portion of host physical address space.

15. The method of claim 13, wherein at least one of said first reusable offset value and said second reusable offset value is zero.

16. The method of claim 13, further comprising using said first and second reusable offset values to look up data requested by the guest operating system.

17. The method of claim 13, further comprising dedicating said contiguous portion of host address space for exclusive use by said guest operating system.

18. A method for improving memory access within a host operating system by a guest operating system, comprising:
   allocating a contiguous portion of host physical address space for use by said guest operating system;
   allocating a contiguous portion of host logical address space for use by said host operating system;
   calculating a first reusable offset value, said first reusable offset value comprising a difference between an address within a guest physical address space and an address of a same memory location within said contiguous portion of host physical address space;
   calculating a second reusable offset value, said second reusable offset value comprising a difference between an address within said host physical address space and an address within a contiguous portion of host logical address space;
   utilizing said first reusable offset value to perform an address translation from a guest physical address space to a contiguous host physical address space and subsequently using said second reusable offset value to perform an address translation from the contiguous host physical address space to an address within the contiguous host logical address space;
   wherein said address translation operations are performed by the host operating system utilizing Direct Memory Access (DMA) directly into guest physical address space.

* * * * *